United States Patent
Reas et al.

(10) Patent No.: US 10,901,708 B1
(45) Date of Patent: Jan. 26, 2021

(54) TECHNIQUES FOR UNSUPERVISED LEARNING EMBEDDINGS ON SOURCE CODE TOKENS FROM NON-LOCAL CONTEXTS

(71) Applicant: Amazon Technologies, Inc., Seattle, WA (US)

(72) Inventors: Russell Reas, Seattle, WA (US); Neela Sawant, Jersey City, NJ (US); Srinivasan Sengamedu Hanumantha Rao, Seattle, WA (US); Yinglong Wang, Redmond, WA (US); Anton Emelyanov, Seattle, WA (US); Shishir Sethiya, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/198,969

(22) Filed: Nov. 23, 2018

(51) Int. Cl.
*G06F 8/41* (2018.01)
*G06N 20/00* (2019.01)
*G06F 8/30* (2018.01)

(52) U.S. Cl.
CPC ............... *G06F 8/42* (2013.01); *G06F 8/31* (2013.01); *G06N 20/00* (2019.01)

(58) Field of Classification Search
CPC ... G06F 8/42; G06F 8/443; G06F 8/41; G06F 8/31; G06N 20/00
See application file for complete search history.

(56) References Cited

U.S. PATENT DOCUMENTS

| | | | | |
|---|---|---|---|---|
| 8,429,628 | B2* | 4/2013 | Spurlin | G06F 8/53 717/144 |
| 9,792,443 | B1* | 10/2017 | Sheridan | G06F 21/577 |
| 2004/0060007 | A1* | 3/2004 | Gottlob | G06F 16/8373 715/234 |
| 2005/0004942 | A1* | 1/2005 | Madsen | H04L 41/0853 |
| 2011/0270604 | A1* | 11/2011 | Qi | G06F 40/30 704/9 |
| 2011/0321018 | A1* | 12/2011 | Tatsubori | G06F 8/53 717/137 |

(Continued)

OTHER PUBLICATIONS

Alon et al., "A General Path-Based Representation for Predicting Program Properties" (Year: 2018).*

(Continued)

*Primary Examiner* — Phillip H Nguyen
(74) *Attorney, Agent, or Firm* — Nicholson De Vos Webster & Elliott LLP

(57) ABSTRACT

Techniques for unsupervised learning of embeddings on source code from non-local contexts are described. Code can be processed to generate an abstract syntax tree (AST) which represents syntactic paths between tokens in the code. Once the AST(s) have been generated, the paths in the AST(s) can be crawled to identify terminals (e.g., leaf nodes in the AST) and paths between terminals can be identified. The pairs of tokens identified at the ends of each path can then be used to generate a cooccurrence matrix. For example, if X number of unique terminals are identified, a matrix of size X by X can be generated to indicate a frequency at which pairs of terminals cooccur. This cooccurrence matrix can then be used as input to existing techniques for learning vector-space embeddings, such as word2vec, GloVe, Swivel, etc.

18 Claims, 9 Drawing Sheets

(56) References Cited

U.S. PATENT DOCUMENTS

2018/0137101 A1* 5/2018 Burchard ................ G06F 40/30
2018/0364992 A1* 12/2018 Yamamoto .............. G06F 8/658

OTHER PUBLICATIONS

Yin et al., "A Syntactic Neural Model for General-Purpose Code Generation" (Year: 2017).*
Zhang et al., "Syntax Encoding with Application in Authorship Attribution" (Year: 2018).*

* cited by examiner

400

```
Boolean METHODNAME(Object identifier) {
    for (Object id2: this.id2) {
        if (id2.equals(identifier)) {
            return true;
        }
    }
    return false;
}
```

… (1)

TECHNIQUES FOR UNSUPERVISED LEARNING EMBEDDINGS ON SOURCE CODE TOKENS FROM NON-LOCAL CONTEXTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for unsupervised learning of embeddings on source code from non-local contexts are described. According to some embodiments, code can be processed to generate an abstract syntax tree (AST). The AST represents syntactic paths between tokens in the code. ASTs can be generated for each code file, or for portions of code a code file such as individual methods or classes. In some embodiments, an AST can be generated for an entire codebase. Once the AST(s) have been generated, the paths in the AST(s) can be crawled to identify terminals (e.g., leaf nodes in the AST) and paths between terminals can be identified. The pairs of tokens identified at the ends of each path can then be used to generate a cooccurrence matrix. For example, if X number of unique terminals are identified, a matrix of size X by X can be generated to indicate a frequency at which pairs of terminals cooccur. This cooccurrence matrix can then be used as input to existing techniques for learning vector-space embeddings, such as word2vec, GloVe, Swivel, etc.

Natural language processing (NLP) includes techniques for learning vector-space embeddings for natural languages (e.g., English, French). Examples of these techniques include word2vec, GloVe, Swivel, etc. However, these techniques cannot be easily applied to computer code, where particular words (e.g., tokens) in the code may not be related based on locality. For example, a variable name declared outside of a loop, inside of which it is mutated, may be separated by tens or hundreds of other tokens. Additionally, the value returned by a function may be used in an unexpected way elsewhere. Accordingly, traditional techniques that rely on local context, text-locality (e.g., treating code as if it were natural language), do not result in accurate analyses of code. Embodiments use an abstract syntax tree (AST) representation of the code to identify cooccurrence of tokens in source code. This cooccurrence may be identified across a portion of code, code files, or across an entire codebase. Embodiments can then count cooccurrences of tokens at distinct ends of paths through the AST. The tokens at the ends of these paths define values in the code, such as specific names of types, variables, classes and the like. Deriving the described cooccurrence matrix enables the use of NLP techniques to identify word embeddings in the code.

Figure 1:
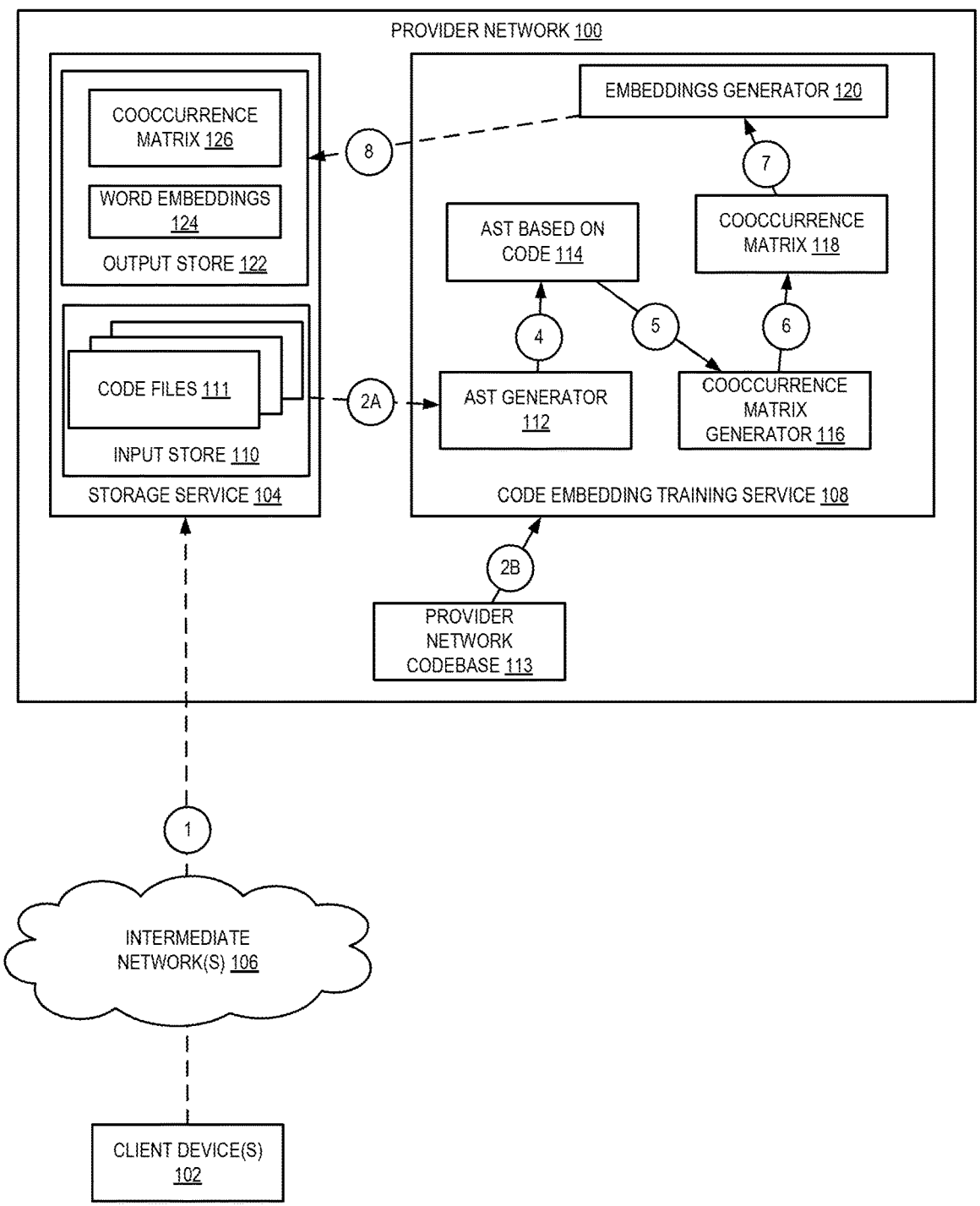
FIG. 1 is a diagram illustrating an environment for unsupervised learning of embeddings on source code from non-local contexts according to some embodiments.

FIG. 1 is a diagram illustrating an environment for unsupervised learning of embeddings on source code from non-local contexts according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, a customer can upload code to code embedding training service 108 in provider network 100 using a client device 102. The client device 102 can access the code embedding training service over one or more intermediate networks 106 through an interface provided by code embedding training service 108, such as an API, console, application, etc. In some embodiments, a user can upload one or more code files 111 to an input store 110 in a storage service 104, as shown at numeral 1. In some embodiments, the storage service may provide a virtual data store (e.g., a folder or "bucket", a virtualized volume, a database, etc.) provided by the provider network 100. The user may access the functionality of storage service 104, for example via one or more APIs, to access data from the output store 122 and store data to the input store 110. In some embodiments, input store 110 may store code from a plurality of different customers. The code may be uploaded to train word embeddings for source code files. By utilizing a large code base, the word embeddings may be used to later analyze code as it is received from customers to perform, e.g., debugging, variable/function naming, or other code processing and analysis.

At numeral 2A, the code embedding training service can obtain the user code from input store 110. Additionally, or alternatively, the code embedding training service 108 can obtain provider network codebase 113. The provider network codebase 113 may include the source code of the provider network 100 underlying the various services provided by provider network 100.

AST generator 112 can generate an AST for the code files 111 and/or the provider network codebase 113. In some embodiments, the AST may be generated for all of the code files and provider network codebase as a whole, or may generate a separate AST for each code file or portion of code that has been provided to code embedding training service 10. The AST is a representation of the code as a tree structure that reflects the abstract syntactic structure of the code. The AST(s) can be output at numeral 4 and used as input for cooccurrence matrix generator 116 at numeral 5.

Cooccurrence matrix generator 116 can sample paths of the AST(s) to determine a number of cooccurrences of token pairs in the code. In some embodiments, cooccurrence matrix generator 116 can crawl the AST(s) to identify a plurality of paths, each path going from a terminal node to another terminal node (e.g., leaf nodes of the AST). In some embodiments, every path of the AST(s) may be crawled and pairs of tokens may be identified for each path. However, because the AST(s) may present a large number of paths, one or more hyperparameters may be used to sample the paths, reducing the amount of processing required to crawl every path in the AST(s). For example, each path may include a number of hops between terminal nodes, where each hop represents a different semantic element within the AST. A path hop hyperparameter may be used to limit the analysis to paths having a particular number of hops (or fewer than a maximum number of hops). Additionally, or alternatively, a node type filter may be used to limit the analysis to paths that include a particular node type or exclude paths that include a particular node type. Further examples of the use of such hyperparameters are discussed below with respect to FIG. 3.

Once the paths to be analyzed, selected based on one or more hyperparameters, have been determined, the pair of tokens representing the terminal nodes of each path can be identified. In some embodiments, cooccurrence matrix generator 116 can record each pair of terminal node tokens as well as a list of all unique terminal node tokens that have been identified. Using this information, the cooccurrence matrix 118 can be generated. The resulting cooccurrence matrix 118 may be a X by X sized matrix, where X is the number of unique tokens identified at the terminal nodes in the AST (e.g., the cooccurrence matrix may be a square matrix of order X). For example, if a given AST has 100 unique terminal nodes, the resulting cooccurrence matrix may be a 100 by 100 matrix. Each cell of the matrix may include a value indicating a number of times the corresponding pair of tokens were co-occurrent at the ends of a path in the AST. In various embodiments, the cooccurrence matrix may cover all of a user's code being analyzed (e.g., including code across multiple files or submitted code portions).

At numeral 7, the cooccurrence matrix 118 can be input to embeddings generator 120. Embeddings generator 120 may implement one or more unsupervised NLP techniques for training word embeddings based on a statistical representation of words in a corpus. In this example, the words are taken from a codebase. As discussed, while embeddings in traditional NLP may rely on local word context, the same is not necessarily true in code. This is because in natural language words obtain meaning from their local context (e.g., within a given sentence). However, code is not structured the same way as natural language. For example, a method may be defined in one part of the code and then used much later in the code, or multiple methods may be defined in the same portion of code but serve different functions/ usage. By identifying pairs of co-occurrent tokens using the AST, embodiments identify tokens that are related within the structure and semantics of the code. Embeddings generator can use traditional embeddings learning techniques from NLP based on the cooccurrence matrix 118 which, as described above, has been constructed to capture the code specific relationships between tokens, rather than traditional NLP relationships.

At numeral 8, the embeddings generator 120 can output the word embeddings 124 to an output store 122. In some embodiments, the embeddings generator 120 may additionally, or alternatively, output the cooccurrence matrix 126 to output store 122. Although the word embeddings 124 and cooccurrence matrix 126 are shown stored in the same output data store, in various embodiments these may be stored in separate data stores or provided directly to the user.

In some embodiments, co-occurrent pairs of terminal nodes may be counted without the use of a cooccurrence matrix. For example, as the AST(s) are crawled pairs of terminal nodes can be identified for each path. The number of unique pairs of terminal nodes can be tracked along with the frequency with which each pair of terminal nodes is identified. If a pair of terminal nodes is identified more than a threshold number of times, that pair can be provided as a positive training example for use in identifying word embeddings.

In some embodiments, in addition to global token relationships learned through the above-described use of AST(s) and corresponding cooccurrence matrices, local learning techniques may also be used. For example, a local window, which defined a number of tokens before and after a given token, may be defined and used to predict that term as a function of the original input term. This local context-based learning may be combined with the global token relationships described above when generating word embeddings.

Once the embeddings have been obtained by the user, the embeddings may be used to automatically provide method, class, variable, or other element names In some embodiments, the embeddings may be trained that can identify elements within a codebase, such as identify variable names, method names, etc. In various embodiments, the embeddings may be trained in an unsupervised fashion, that is no additional labels provided by a user are required to train the embeddings.

In some embodiments, embeddings can be trained at the sub-token level. For example, the terminal node tokens identified above may be separated tokens following code conventions (e.g., camelCase can be divided into the sub-tokens: camel and case). The resulting subtokens can be linked to the parent token through a node type or path. Sub-token embeddings may be useful for generating never-before-seen code fragments, names and related. Using sub-token embeddings can also reduce the total vocabulary size. Because terminal node tokens may share subtokens, if the terminal nodes are divided into subtokens, the total number of unique values may be reduced. This results in a smaller cooccurrence matrix and improves processing time.

Figure 2:
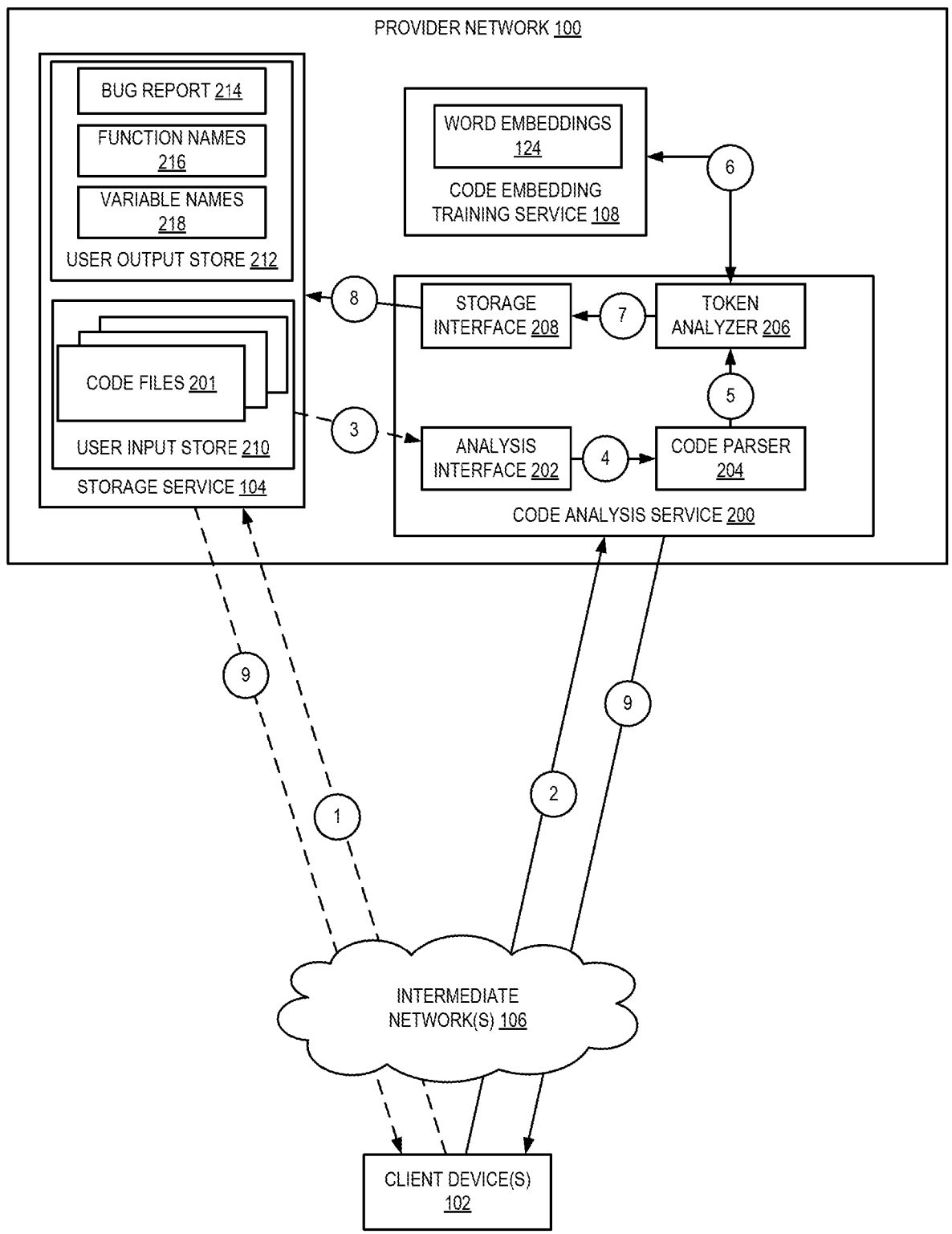
FIG. 2 is a diagram illustrating an environment for using embeddings to auto-populate names in source code according to some embodiments.

FIG. 2 is a diagram illustrating an environment for using embeddings to auto-populate names in source code according to some embodiments. As shown in FIG. 2, a customer can access code analysis service 200 in provider network 100 using a client device 102. The client device 102 can access the code embedding training service over one or more intermediate networks 106 through an interface provided by code analysis service 200, such as an API, console, application, etc. In some embodiments, a user can upload one or more code files 201 to a user input store 210 in a storage service 104, as shown at numeral 1. In some embodiments, the storage service may provide a virtual data store (e.g., a folder or "bucket", a virtualized volume, a database, etc.) provided by the provider network 100. The user may access the functionality of storage service 104, for example via one or more APIs, to access data from the output store 122 and store data to the input store 110. The user input store 210 may be controlled by the customer, who can grant a role or other permission to code analysis service 200 to access the user input store 210.

At numeral 2, the user can send a request to code analysis service 200 to generate embeddings for the user's code. The request may include a reference to the code files 201 that were uploaded to input store 110 at numeral 1. In some embodiments, the user may provide all or a portion of the code with the request at numeral 2. For example, code analysis service 200 may provide an analysis interface 202 through which all or portions of the user's code may be provided, e.g., by copying and pasting code from a copy of a code file accessible to the client device 102 to the interface, rather than uploading entire code files. In various embodiments, the code files may include source code files, byte code (which may be decompiled into source code), or other code from which an AST can be generated. The analysis interface 202 can also obtain any code files 201 that were uploaded to user input store 210.

The customer code can be provided to code parser 204 which can identify tokens in the customer code 201. For example, the code parser 204 can generate an AST for the customer code and identify terminal node values in the AST. The terminal node values can be passed at numeral 5 to token analyzer 206. Token analyzer 206 can use the previously trained word embeddings, obtained from code embedding training service 108, as shown at numeral 6, to analyze the code, e.g., to identify potential errors (e.g., "bugs") in the code, to automatically generate variable or function names, etc., based on the token values and the word embeddings using NLP processing techniques.

At numeral 7, once the token analysis is complete, the results can be passed to storage interface 208 and at numeral 8 that results can be stored in user output store 212. As discussed, the output may include a potential bug report 214, automatically generated function names 216, or automatically generated variable names 218. In some embodiments, the code files 201 may be updated to include the automatically generated variable and/or function names and the updated code files may be stored in user output store 212.

At numeral 9, the code analysis service can provide the results to the user or can provide a reference to the user output store 212 that includes the results. At numeral 10, if the user has been provided with a reference to the user output data store, the user can retrieve the results from the storage service 104 using the reference. In various embodiments, a reference to an input or output store in storage service 104 may include a storage identifier, a URI, a URL, or other reference.

Figure 3:
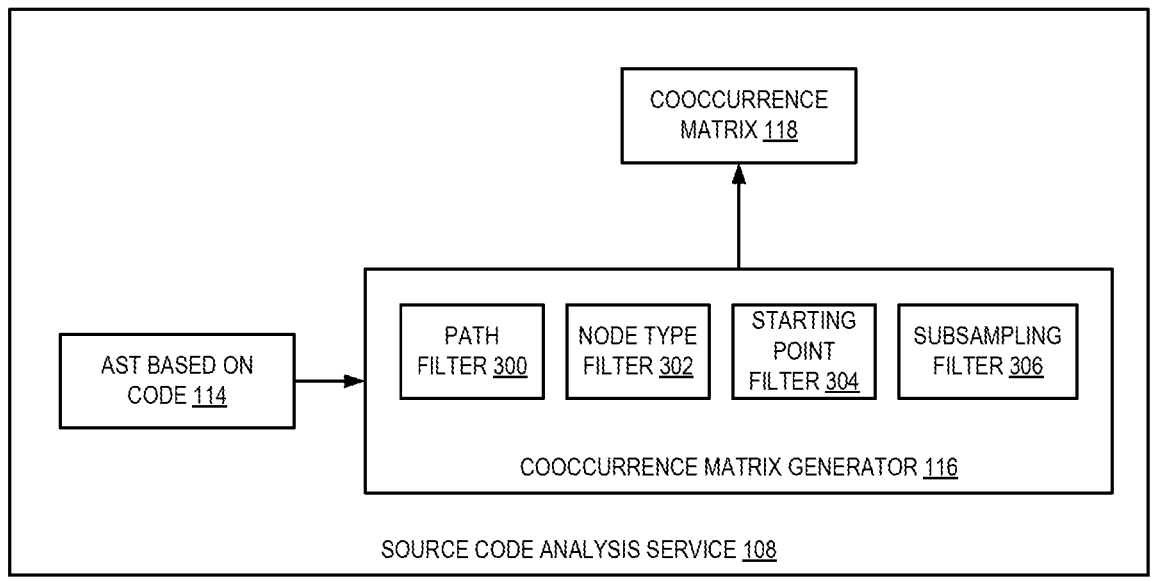
FIG. 3 is a diagram illustrating examples of sampling paths within an abstract syntax tree (AST) to determine token pairs using hyperparameters according to some embodiments.

FIG. 3 is a diagram illustrating examples of sampling paths within an abstract syntax tree (AST) to determine token pairs using hyperparameters according to some embodiments. As shown in FIG. 3, a cooccurrence matrix generator 116 may include a number of hyperparameters that may be used to generate the cooccurrence matrix 118. As discussed, the AST(s) 114 may include a large number of paths. Crawling and identifying terminal tokens for each of these paths may require significant computing resources. Accordingly, hyperparameters may be used to more efficiently analyze the paths of the AST(s) and generate the cooccurrence matrix.

As discussed, a path filter 300 may include a path hop hyperparameter. The path hop hyperparameter may be used to limit the analysis to paths having a particular number of hops (or fewer than a maximum number of hops). For example, the path hop hyperparameter may be used to filter out hops having more hops than the value of the path hop hyperparameter. Alternatively, the path hop hyperparameter may be used to limit the analysis to those paths have a number of hops equal to the value of the path hop hyperparameter or to those paths having more hops than the path hop hyperparameter.

Additionally, or alternatively, a node type filter 302 may be used to limit the analysis to paths that include a particular node type or exclude paths that include a particular node type. For example, any path passing through the root node of the AST may be filtered out, as this may result in terminal nodes that are too separated as to be meaningfully related. Similarly, a starting point filter 304 may filter out paths that include a particular starting point node in the AST. For example, every variable name and function name be represented as a terminal node in an AST, however other more generic parts of the code such as the word "function" may also be represented as terminal nodes in the AST. Accordingly, paths starting at a variable name or function name may be followed while paths starting at a generic part of the code such as "function" may be filtered out using the starting point filter. A starting point hyperparameter may specify which starting point nodes are to be used to filter out paths. In some embodiments, a subsampling filter 306 may be used to sample the number of paths that are to be analyzed. For example, a depth first search (or other search of the AST) may be performed to identify terminal nodes. When the depth first search identifies a decision point in the AST, the path followed after that decision point may be determined based on the subsampling hyperparameter. For example, the hyperparameter may define that a random path following the decision point is followed, or it may define that all "true" paths are followed or all "false" paths (or other values) are followed from a decision point. In some embodiments, the subsampling hyperparameter may indicate a number of terminal nodes to reach while traversing the AST before analyzing the AST. For example, the hyperparameter may indicate that random paths are to be followed until ten (or another configurable number of) terminal nodes are identified.

Figure 4:
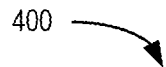
FIG. 4 is a diagram illustrating an example of analyzing code to generate an AST.

FIG. 4 is a diagram illustrating an example 400 of analyzing code to generate an AST. Various techniques may be used to generate an AST from code. As shown in FIG. 4, a simple code example may have a number of different elements which can be identified as being linked. The code example 400 may be broken down into tokens (e.g., "boolean," "target," "return," "true," etc.). Based on the values of the tokens in the code example and the semantics of the code, an AST representing the code can be produced, as shown in FIG. 4.

Figure 5:
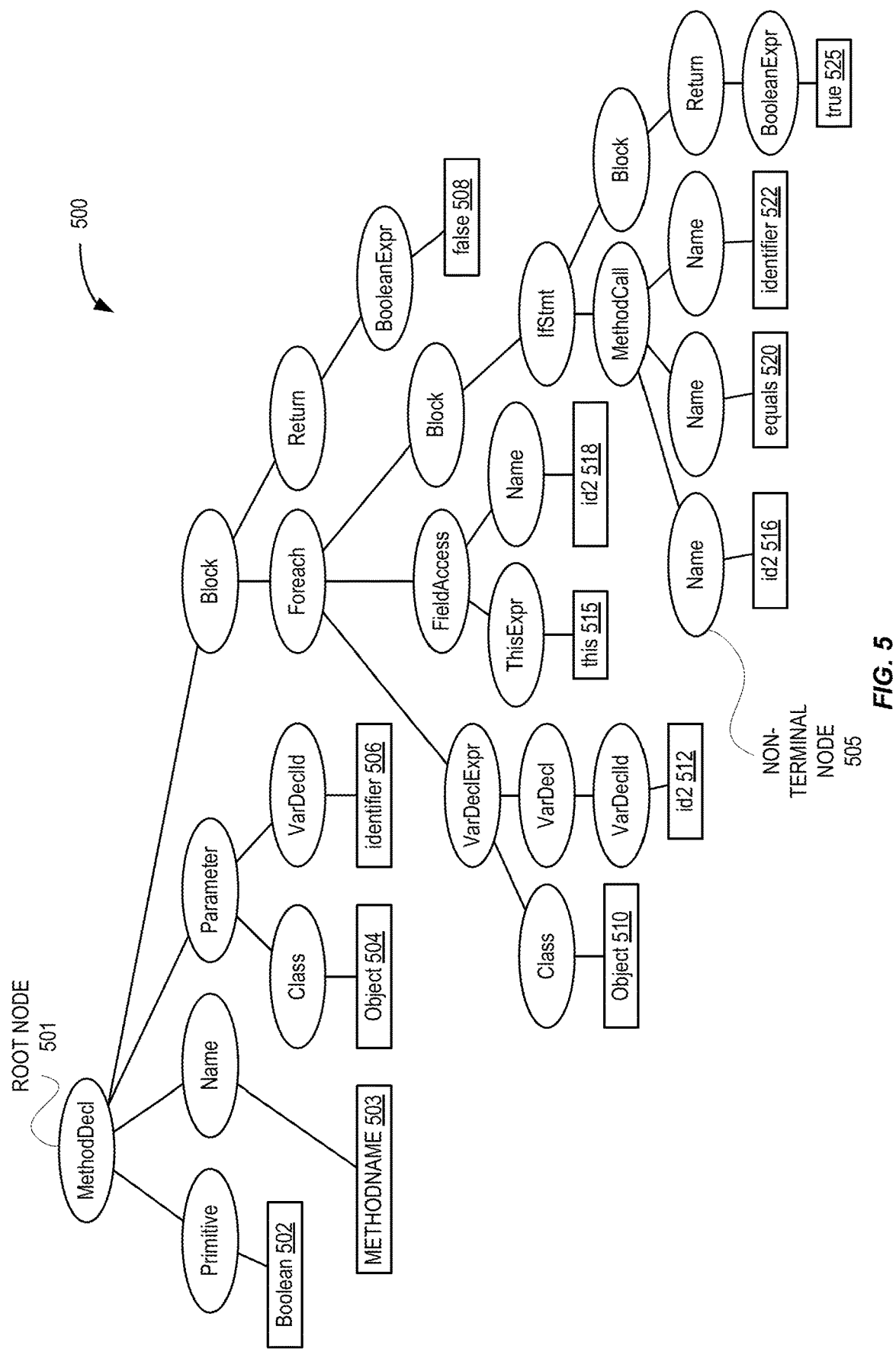
FIG. 5 is a diagram illustrating an example AST.

FIG. 5 is a diagram illustrating an example AST 500. As shown in FIG. 5, the links between elements are shown in AST 500. For example, the link from "id2" in the for loop to "true" in the if statement, is shown tracing a path from the terminal node "id2" in the "foreach" node to the terminal node "true" in the "if" node. A plurality of paths may be identified in this AST, with each path starting and ending at a different terminal node 502-524 and including one or more non-terminal nodes, such as non-terminal node 505. For example, a path may be traced from true 524 to target 522, and from equals 520 to this 514, etc. The paths may be filtered as described above prior to generating a cooccurrence matrix. For example, paths passing through the method declaration "MethodDec1" may be filtered out. Similarly, paths having more than 5 hops (or other configurable number) may be filtered out. For example, the path from true 524 to id2 516 may have a number of hops (e.g., 6) that is greater than the path hop hyperparameter and therefore may be filtered out.

In this example, assuming all paths were analyzed, the resulting cooccurrence matrix is of size 9 by 9, because there are nine unique terminal node values (e.g., object 504 and 510, id2 512 and 516, etc., each correspond to one unique value). The cooccurrence matrix can then be populated with a number of times each pair of tokens appears in paths of the AST 500.

Figure 6:
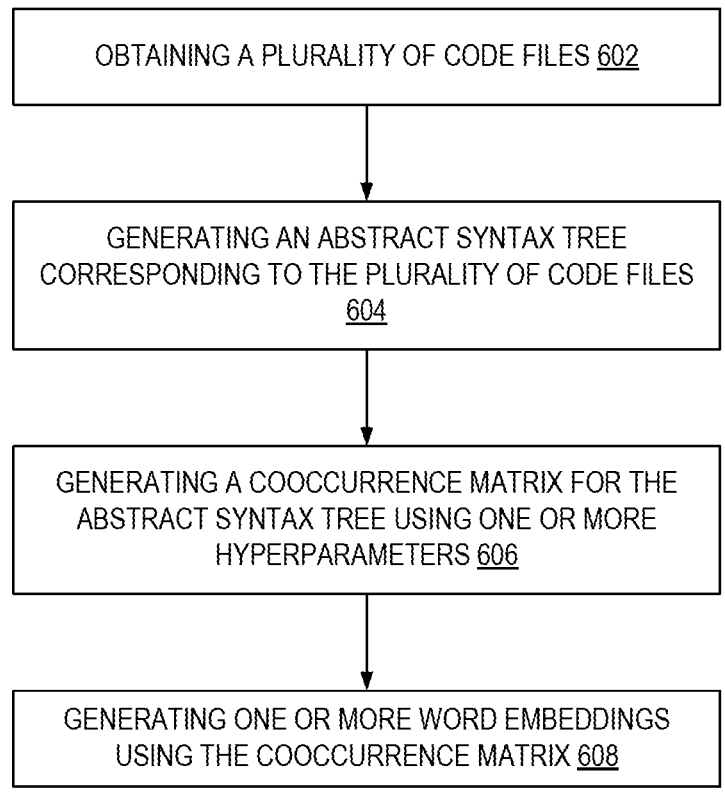
FIG. 6 is a flow diagram illustrating operations of a method for unsupervised learning of embeddings on source code from non-local contexts according to some embodiments.

FIG. 6 is a flow diagram illustrating operations 600 of a method for unsupervised learning of embeddings on source code from non-local contexts according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by code embedding training service 108 of the other figures.

The operations 600 include, at block 602, obtaining a plurality of code files. In some embodiments, the plurality of code files may include source code files. In some embodiments, the plurality of code files may be obtained by decompiling byte code. In some embodiments, the plurality of code files may be received with a request to perform code analysis or the plurality of code files may be uploaded to a storage service that is accessible to the code analysis service. The operations 600 include, at block 604, generating an abstract syntax tree corresponding to the plurality of code file.

The operations 600 include, at block 606, generating a cooccurrence matrix for the abstract syntax tree using one or more hyperparameters. In some embodiments, generating the cooccurrence matrix may further include identifying a plurality of paths in the abstract syntax tree, each path having a first terminal node and a second terminal node, identifying pairs of terminal node values corresponding to the first terminal node and the second terminal node of each of the plurality of paths, counting a number of times each pair of terminal node values co-occur, and generating the cooccurrence matrix using the number of times each pair of terminal node values co-occur. In some embodiments, a number of unique terminal node values may be identified and the cooccurrence matrix is a square matrix having an order corresponding to the number of unique terminal values. The operations 600 include, at block 608, generating one or more word embeddings using the cooccurrence matrix.

In some embodiments, identifying a plurality of paths in the abstract syntax tree, each path having a first terminal node and a second terminal node, may include filtering the plurality of paths to identify a subset of the plurality of paths having a number of hops less than or equal to a number defined by a path hop hyperparameter. In some embodiments, identifying a plurality of paths in the abstract syntax tree, each path having a first terminal node and a second terminal node, may further include filtering the plurality of paths to identify a subset of the plurality of paths having a starting point defined by a starting point hyperparameter. In some embodiments, identifying a plurality of paths in the abstract syntax tree, each path having a first terminal node and a second terminal node, may further include filtering the plurality of paths to identify a subset of the plurality of paths which do not include a node type defined by a node type hyperparameter. In some embodiments, identifying a plurality of paths in the abstract syntax tree, each path having a first terminal node and a second terminal node, may further include sampling a subset of the plurality of paths using a subsampling hyperparameter.

In some embodiments, the operations may include receiving a request to perform code analysis, the request include a reference to a plurality of source code files stored in a storage service, retrieving the plurality of source code files from the storage service using the reference, generating an abstract syntax tree corresponding to the plurality of source code files, the abstract syntax tree including a plurality of paths, each path defined by a first terminal node and a second terminal node, filtering the plurality of paths based on at least one hyperparameter to determine a subset of paths, determining a number of unique terminal node values in the subset of paths, identifying pairs of terminal node values corresponding to the first terminal node and the second terminal node of each path of the subset of paths, counting a number of times each pair of terminal node values co-occur, generating a cooccurrence matrix for the abstract syntax tree using the number of unique terminal values in the subset of paths and the number of times each pair of terminal node values co-occur, and generating one or more word embeddings using the cooccurrence matrix.

Figure 7:
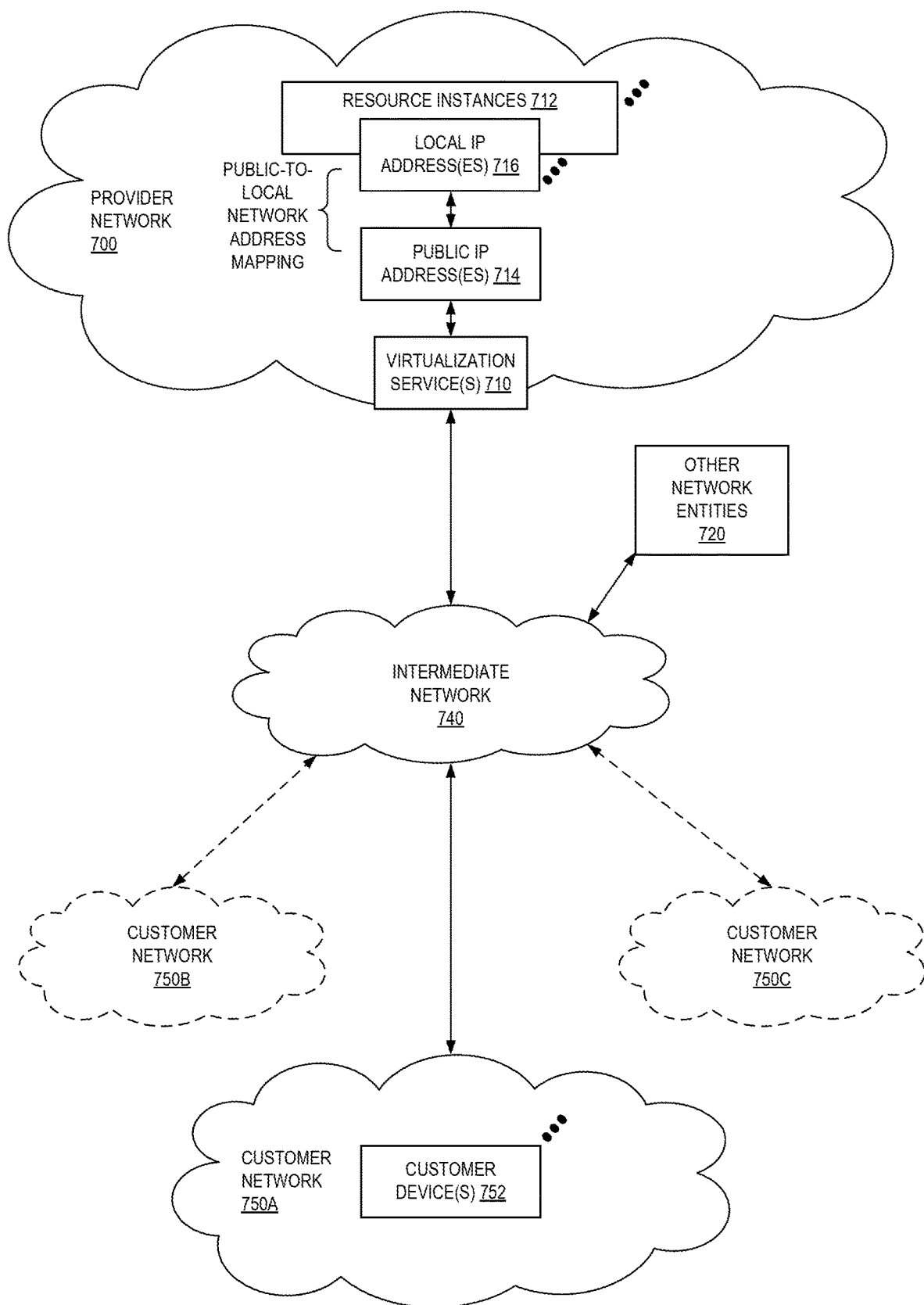
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 7 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
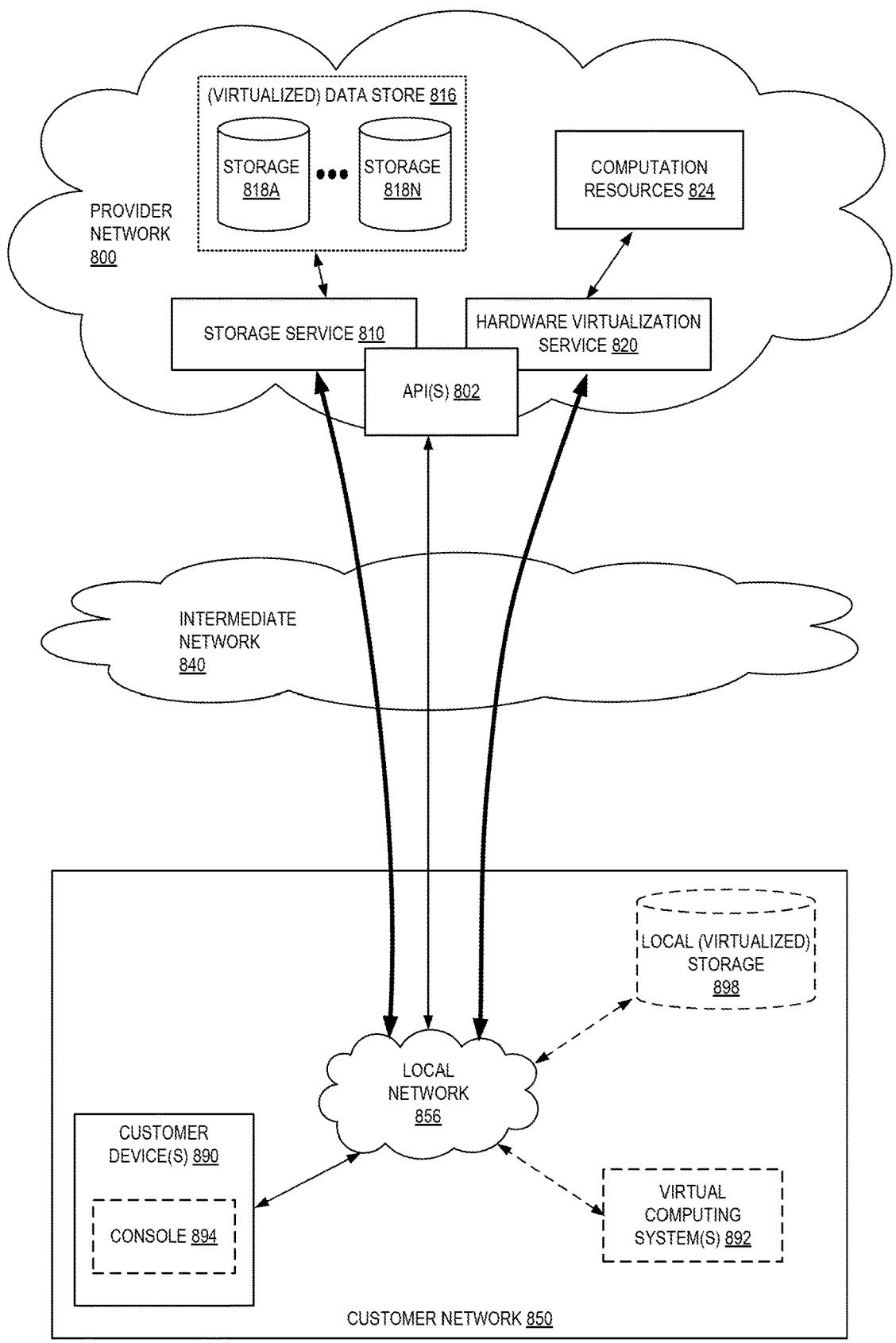
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
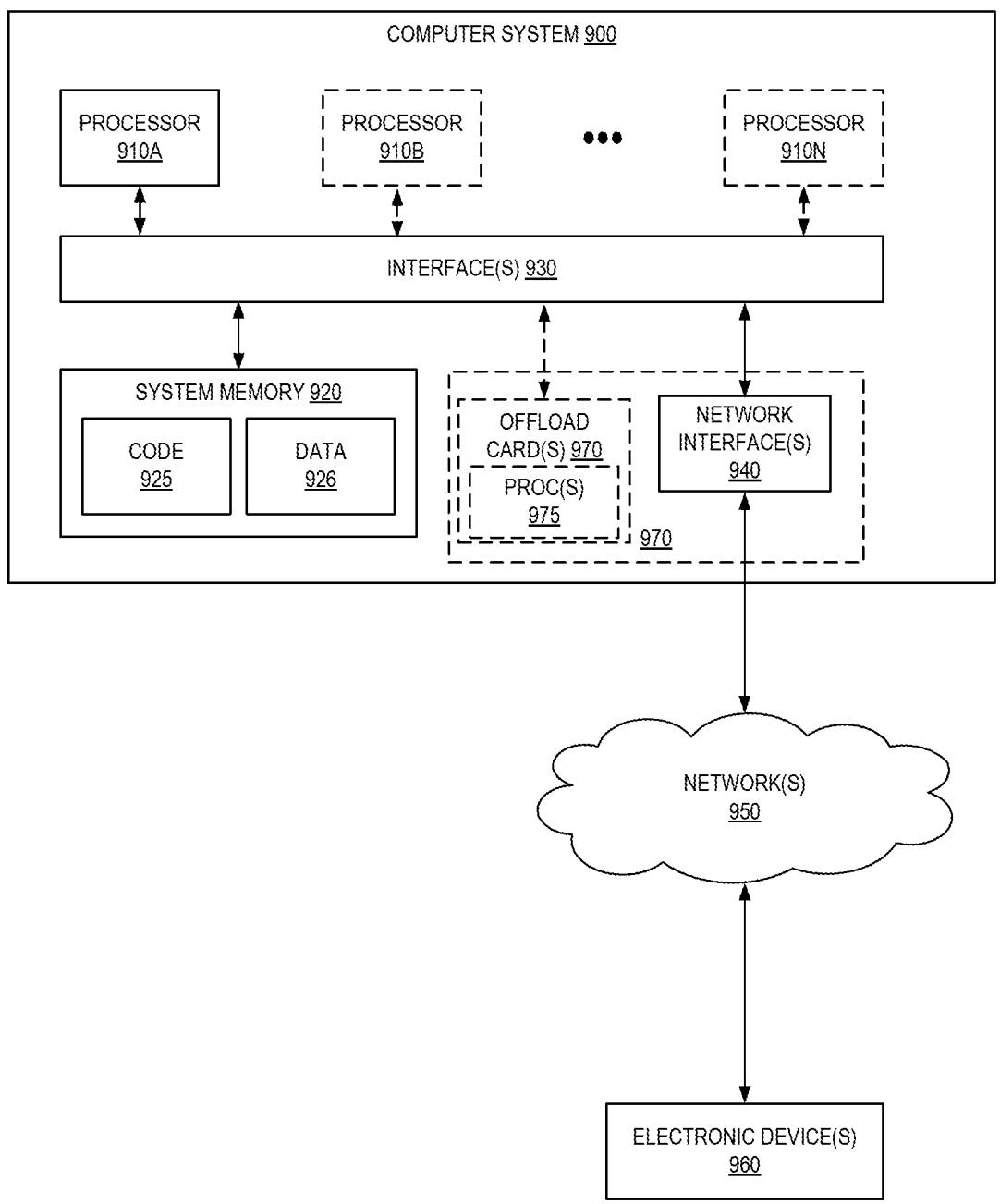
FIG. 9 is a block diagram illustrating an example computer system that may be used in some embodiments.

In some embodiments, a system that implements a portion or all of the techniques for unsupervised learning of embeddings on source code from non-local contexts as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to perform code analysis, the request include a reference to a plurality of source code files stored in a storage service;
   retrieving the plurality of source code files from the storage service using the reference;
   generating an abstract syntax tree corresponding to the plurality of source code files, the abstract syntax tree including a plurality of paths, each path defined by a first terminal node and a second terminal node;
   filtering the plurality of paths based on at least one hyperparameter to determine a subset of paths;
   determining a number of unique terminal node values in the subset of paths;
   identifying pairs of terminal node values corresponding to the first terminal node and the second terminal node of each path of the subset of paths;
   counting a number of times each pair of terminal node values co-occur;
   generating a cooccurrence matrix for the abstract syntax tree using the number of unique terminal values in the subset of paths and the number of times each pair of terminal node values co-occur; and
   generating one or more word embeddings using the cooccurrence matrix.

2. The computer-implemented method of claim 1, wherein filtering the plurality of paths based on at least one hyperparameter to determine a subset of paths, further comprises:

identifying the subset of paths having a number of hops less than or equal to a number defined by a path hop hyperparameter.

3. The computer-implemented method of claim 1, wherein filtering the plurality of paths based on at least one hyperparameter to determine a subset of paths, further comprises:
identifying the subset of paths which do not include a node type defined by a node type hyperparameter.

4. A computer-implemented method comprising:
obtaining a plurality of code files;
generating an abstract syntax tree corresponding to the plurality of code files;
identifying a plurality of paths in the abstract syntax tree, each path having a first terminal node and a second terminal node;
identifying pairs of terminal node values corresponding to the first terminal node and the second terminal node of each of the plurality of paths;
counting a number of times each pair of terminal node values co-occur;
generating a cooccurrence matrix for the abstract syntax tree using the number of times each pair of terminal node values co-occur; and
generating one or more word embeddings using the cooccurrence matrix.

5. The computer-implemented method of claim 4, wherein generating a cooccurrence matrix for the abstract syntax tree using one or more hyperparameters further comprises:
dividing each terminal node value into subtokens; and
identifying a number of unique subtokens, wherein the cooccurrence matrix is a square matrix having an order corresponding to the number of unique subtokens.

6. The computer-implemented method of claim 4, wherein identifying a plurality of paths in the abstract syntax tree, each path having a first terminal node and a second terminal node, further comprises:
filtering the plurality of paths to identify a subset of the plurality of paths having a number of hops less than or equal to a number defined by a path hop hyperparameter.

7. The computer-implemented method of claim 4, wherein identifying a plurality of paths in the abstract syntax tree, each path having a first terminal node and a second terminal node, further comprises:
filtering the plurality of paths to identify a subset of the plurality of paths having a starting point defined by a starting point hyperparameter.

8. The computer-implemented method of claim 4, wherein identifying a plurality of paths in the abstract syntax tree, each path having a first terminal node and a second terminal node, further comprises:
filtering the plurality of paths to identify a subset of the plurality of paths which do not include a node type defined by a node type hyperparameter.

9. The computer-implemented method of claim 4, wherein identifying a plurality of paths in the abstract syntax tree, each path having a first terminal node and a second terminal node, further comprises:
sampling a random subset of the plurality of paths using a subsampling hyperparameter.

10. The computer-implemented method of claim 4, wherein the plurality of code files includes a plurality of source code files.

11. The computer-implemented method of claim 4, wherein obtaining a plurality of code files further comprises:
decompiling byte code to generate the plurality of code files.

12. A system comprising:
a first one or more electronic devices implementing a storage service; and
a second one or more electronic devices implementing a code embedding training service, the code embedding training service including instructions that upon execution cause the code embedding training service to:
obtain a plurality of code files;
generate an abstract syntax tree corresponding to the plurality of code files;
identify a plurality of paths in the abstract syntax tree, each path having a first terminal node and a second terminal node;
identify pairs of terminal node values corresponding to the first terminal node and the second terminal node of each of the plurality of paths;
count a number of times each pair of terminal node values co-occur;
generate a cooccurrence matrix for the abstract syntax tree using the number of times each pair of terminal node values co-occur; and
generate one or more word embeddings using the cooccurrence matrix.

13. The system of claim 12, wherein to generate a cooccurrence matrix for the abstract syntax tree using one or more hyperparameters, the instructions when executed further cause the code embedding training service to:
dividing each terminal node value into subtokens; and
identify a number of unique subtokens, wherein the cooccurrence matrix is a square matrix having an order corresponding to the number of unique subtokens.

14. The system of claim 12, wherein to identify a plurality of paths in the abstract syntax tree, each path having a first terminal node and a second terminal node, the instructions when executed further cause the code embedding training service to:
filter the plurality of paths to identify a subset of the plurality of paths having a number of hops less than or equal to a number defined by a path hop hyperparameter.

15. The system of claim 12, wherein to identify a plurality of paths in the abstract syntax tree, each path having a first terminal node and a second terminal node, the instructions when executed further cause the code embedding training service to:
filter the plurality of paths to identify a subset of the plurality of paths having a starting point defined by a starting point hyperparameter.

16. The system of claim 12, wherein to identify a plurality of paths in the abstract syntax tree, each path having a first terminal node and a second terminal node, the instructions when executed further cause the code embedding training service to:
filter the plurality of paths to identify a subset of the plurality of paths which do not include a node type defined by a node type hyperparameter.

17. The system of claim 12, wherein to identify a plurality of paths in the abstract syntax tree, each path having a first terminal node and a second terminal node, the instructions when executed further cause the code embedding training service to:
sample a random subset of the plurality of paths using a subsampling hyperparameter.

18. The system of claim 12, wherein the plurality of code files includes a plurality of source code files.

\* \* \* \* \*